United States Patent [19]

Christian et al.

[11] Patent Number: 4,945,564
[45] Date of Patent: * Jul. 31, 1990

[54] PROCESS FOR THE SCRAMBLING AND DESCRAMBLING OF TELEVISION IMAGES

[75] Inventors: Victorion Christian, Rennes; Guionnet Jacques, Vezin le Coquet, both of France

[73] Assignee: Establissement Public de Diffusion dit "Telediffusion de France", France

[*] Notice: The portion of the term of this patent subsequent to Jan. 6, 2004 has been disclaimed.

[21] Appl. No.: 293,605

[22] Filed: Oct. 5, 1989

Related U.S. Application Data

[63] Continuation of Ser. No. 170,136, Mar. 14, 1988, abandoned, which is a continuation of Ser. No. 879,259, Jun. 27, 1986, abandoned.

[30] Foreign Application Priority Data

Jul. 2, 1985 [FR] France .................................. 85 10194

[51] Int. Cl.⁵ ............................................ H04N 7/167
[52] U.S. Cl. ......................................... 380/14; 380/10
[58] Field of Search ...................................... 380/10, 14

[56] References Cited

U.S. PATENT DOCUMENTS

| | | | |
|---|---|---|---|
| 4,070,693 | 1/1978 | Shutterly | 358/123 |
| 4,605,961 | 8/1986 | Frederiksen | 358/123 |
| 4,633,310 | 12/1986 | Gautier | 358/123 |

FOREIGN PATENT DOCUMENTS 0119945  9/1984  European Pat. Off. ............ 358/114

Primary Examiner—Stephen C. Buczinksi
Attorney, Agent, or Firm—Laff, Whitesel, Conte & Saret

[57] ABSTRACT

The useful signal of a sampled video line is, at least partially, spliced into two adjacent segments (AB, BC), each of which has at least two states. The splicing point (B) between the two segments is synchronously defined in a pseudo-random manner at transmission and reception. Upon transmission, at each line and in a pseudo-random manner, one of two possible scrambling schemes is selected. The first scheme involves local reversing of the second segment, and the second scheme involves a reversing of the second segment followed by a permutation with the first segment. Upon reception, the processing is the inverse of the processing which occurred at transmission and is applied in order to reintroduce intelligibility to the video signal. That is the locally reversed segments are received and reversed, following the permutation used at transmission. The process applies to a MAC signal.

5 Claims, 4 Drawing Sheets

PROCESS FOR THE SCRAMBLING AND DESCRAMBLING OF TELEVISION IMAGES

This application is a continuation, of application Ser. No. 07/170,136, filed 3/14/88 which was a continuation of S.N. 06/879,259, filed June 27, 1986, both abandoned.

The present invention relates to a scrambling and descrambling process applied to television pictures, allowing their transmission or broadcasting in a confidential manner. The signals that make up the pictures are subjected at their origin to a transformation such that the pictures become unintelligible during transmission or broadcasting. Upon reception, only the inverse of the previous transformation allows the restoration of the initial picture.

In general, scrambled television broadcasts are intended for users provided with adequate descrambling means allowing them to obtain clear pictures on their receiver screens, the corresponding pictures appearing on the receiver screens of other users being unrecognizable and difficult, if not annoying, to watch. The scrambled signals can be carried on all transmissions or broadcasting channels for which they meet the standards in effect, be they terrestrial transmission or broadcasting networks, cable networks, or satellite transmission or broadcasting networks.

In practice, good scrambling is achieved by combining a number of types or arrangements of scrambling.

A first arrangement introduces modulation polarity inversions. This process is described, for instance, in patents Nos. FR-A-330; DE-A-1,907,580; FR-A-1,034,776; U.S. Pat. No. 2,972,009 and DE-A-1,254,676.

Three other scrambling arrangements introduce delays in the timing of information carried by a television picture line with respect to the synchronization signals. These delays affect either all of the information of the line, causing the effect of a simple delay, or parts of the line.

The simple delay effects, constituting the second scrambling arrangement, make it difficult, if not annoying, for an observer to understand the broadcast, however, when used alone does not guarantee complete confidentiality of the message. This is due to the fact that television picture transmission and broadcasting standards do not allow significant delays between the synchronization information and the video information, without truncating the latter by an information length equal to the maximum delay. Simple delay effects have been discussed in patents Nos. FR-A-2,330,236; DE-A-1,907,580; U.S. Pat. No. 2,510,046; U.S. Pat. No. 2,619,530 and DE-A-1,254,676. Prior art patent U.S. Pat. No. 2,892,882 discusses synchronization impluse width variation between two values.

In the third scrambling arrangement, as described in patents Nos. FR-A-2,431,809 and FR-A-2,320,676, circular delay effects are implemented, and according to patent WO-A-8,102,499, multiple segment delays are implemented which guarantee good confidentiality of the message.

In the fourth scrambling arrangement, at least one part of the signal is cut into two adjacent segments, the cutting point being defined in a pseudo-random manner synchronously at transmission and reception. One or both segments are reversed locally, to be replaced upon reception in an inverse sense. In addition to the pseudo-random cutting point between the segments, there is provided a pseudo-random selection of whether the segments are to be reversed or not. Such a scrambling system is described in document FR-A-2,543,386.

In general, whether television signals are scrambled or not, they can, during transmission or broadcasting, be subject to degradations caused by echo phenomena or delay phenomena which affect all the transitions of the signal. The echo or delay phenomena on a transition are schematically shown in the diagrams of FIGS. 1 and 2 respectively.

In FIG. 1, the transition of the video signal is shown by a solid line and that of the echo by a dashed line. A delay expressed in nanoseconds affects the transition of the echo.

In general, as shown in FIG. 2, the degradation of the signal is greater after the transition than before it. The echo follows the transition and the delay effect is greater after the transition (duration T2, amplutide x%) than before (duration $T1<T2$, amplitude $y\%<x\%$). Typically, we could have $T1=75$ ns, $T2=350$ ns, $y=5\%$, $x=15\%$.

The scrambling processes of the third and fourth categories, recalled above, introduce one or many cut points in the useful part of the video signal and modify the relative position of the segments or reverse them in time. These signal manipulations lead to the introduction, within the scrambled video line, of artificial transitions which correspond to the cutting points. These artificial transitions are affected by the echo and delay phenomena in the same way as the natural transitions. After descrambling, the defects which affect the artificial transitions can have an amplitude and be of sufficient duration to be visible and annoying. Variable length tails appear at the level of the cuts on the unscrambled picture. In all cases, the defects corresponding to the artificial transitions are more annoying than the defects associated with the natural transitions of the signal.

A method of protection against the degradations introduced at the cutting points comprises the provision of some overlap near the cutting points. However, this information redundancy leads to a reduction in the useful length of the line. This may be acceptable with composite television signals such as SECAM, PAL or NTSC where the reduction in length of a line is not very important. With time compressed and multiplexed component coded signals (eg. the system known as MAC for Multiplexed Analogue Component Signal) and in particular as described in the article "Systeme C-MAC/paquets pour la television directe par satellite" by H. Mertens and D. Wood, published in the UER technical journal No. 200 (August 1983), it has been found that this technique cannot be carried out, because in order to be efficient the technique would require too much reduction in the line length to result in a useful picture. In fact, if each component is scrambled separately, two cutting points must be foreseen (one per component), and just as many overlap points. The reduction of the line is further amplified by the time compression of the signal.

One object of the invention consists in providing one or a number of types of scrambling which allow the minimization, on the unscrambled picture, of the effects and the assymetric defects illustrated in FIGS. 1 and 2.

In other respects, a further object of the invention consists in providing an unscrambling system which is applicable not only to separate component systems (eg. MAC), but also to composite signal televison standards.

Another object of the invention consists in providing a system that does not require any overlap. This latter technique can, however, be used with the former to increase its efficiency in particularly unfavorable conditions.

The case where the line (or the luminance component, or the colour difference component) is cut into two segments, the second of which is overlapped (a scrambling process of the fourth type already described) meets this condition. However, the use of only this type of scrambling would not be sufficient to guarantee good confidentiality. It is necessary to implement at least another scrambling.

In accordance with one embodiment of the invention, a scrambling scheme is provided in which at least a portion of the useful signal is cut into two adjacent segments, the cutting point between the two segments being defined in a pseudo-random manner synchronized at transmission and reception, with the second segment being reversed and permutated with the first segment, at transmission.

In accordance with another embodiment, the pseudo-random definition of the cutting point between the segments is characterized by a selected pseudo-random scrambling scheme comprised of: either locally reversing the second segment, or reversing the second segment, then permutating it with the first segment.

The above mentioned embodiments of the invention, as well as other, will become clearer upon reading the following description, the said description being in relation to the attached drawings, among which:

Figure 1:
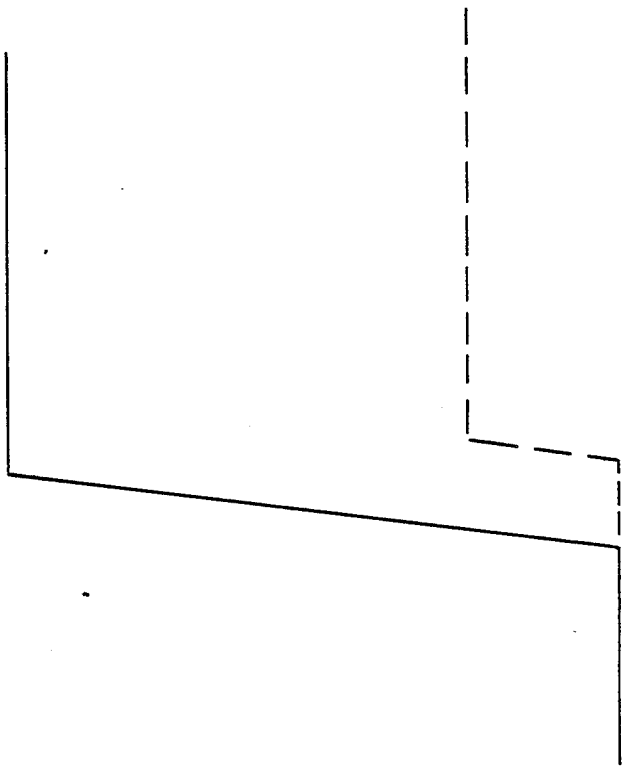
FIG. 1 is a diagram illustrating the echo phenomenon at a transition.
Figure 2:
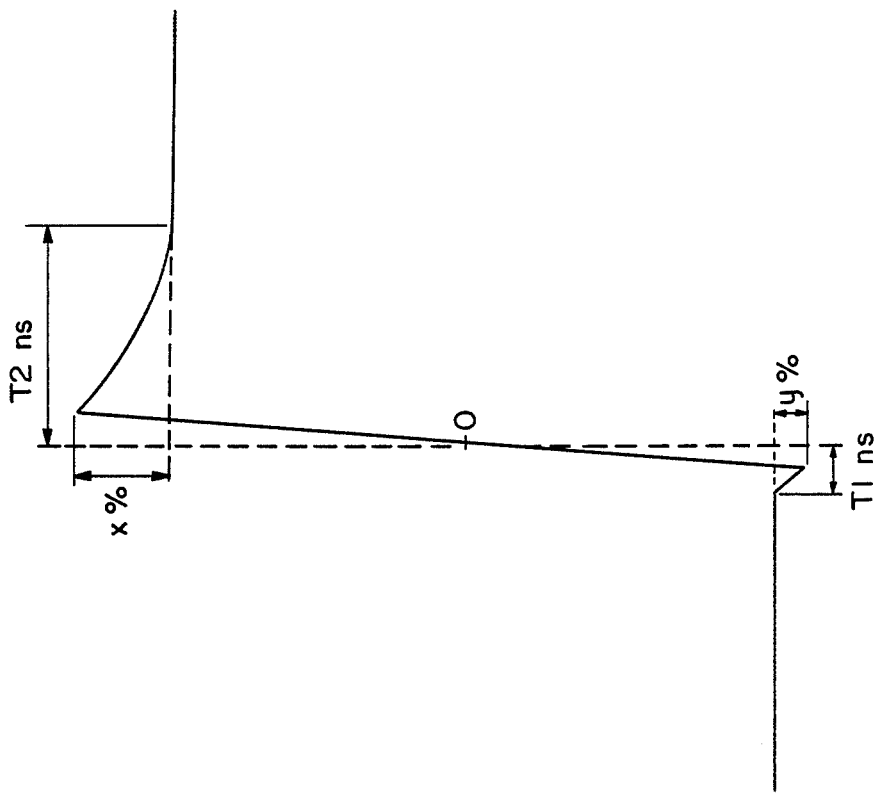
FIG. 2 is a diagram illustrating the delay phenomenon at a transition.
Figure 3:
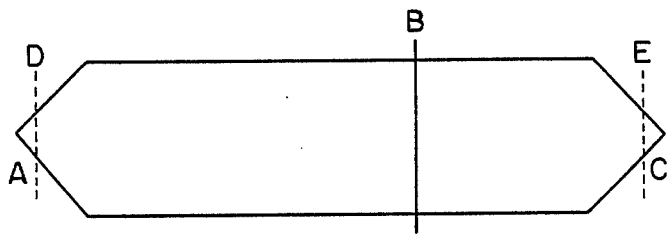
Figure 4:
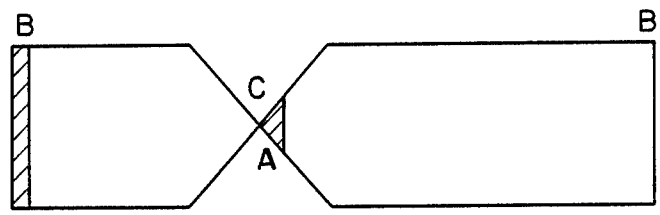
Figure 5:
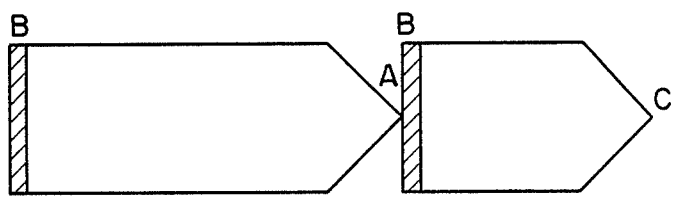
Figure 6:
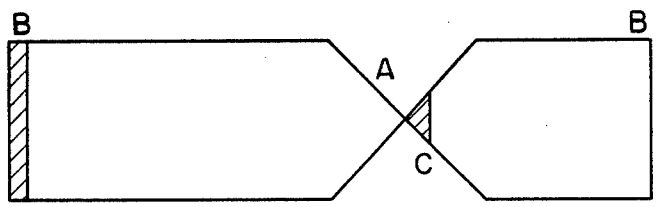
Figure 7:
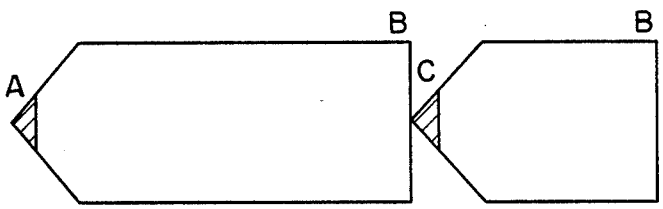
Figure 8:
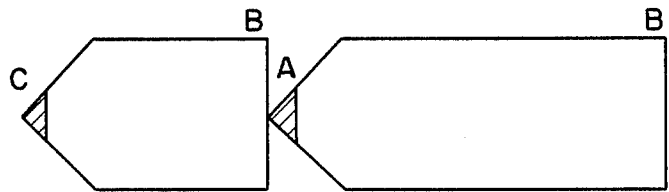
Figure 9:
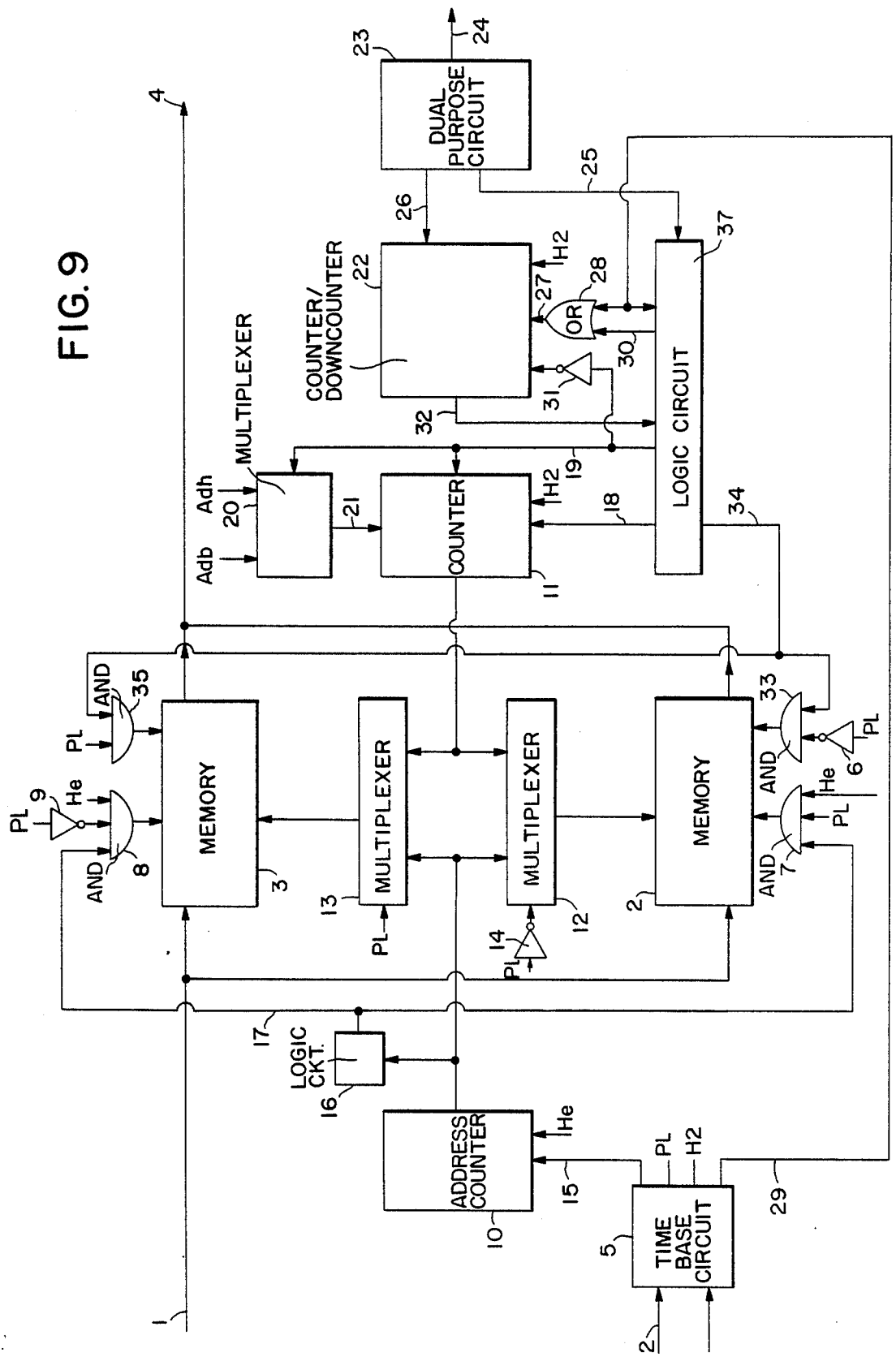
Figure 10:
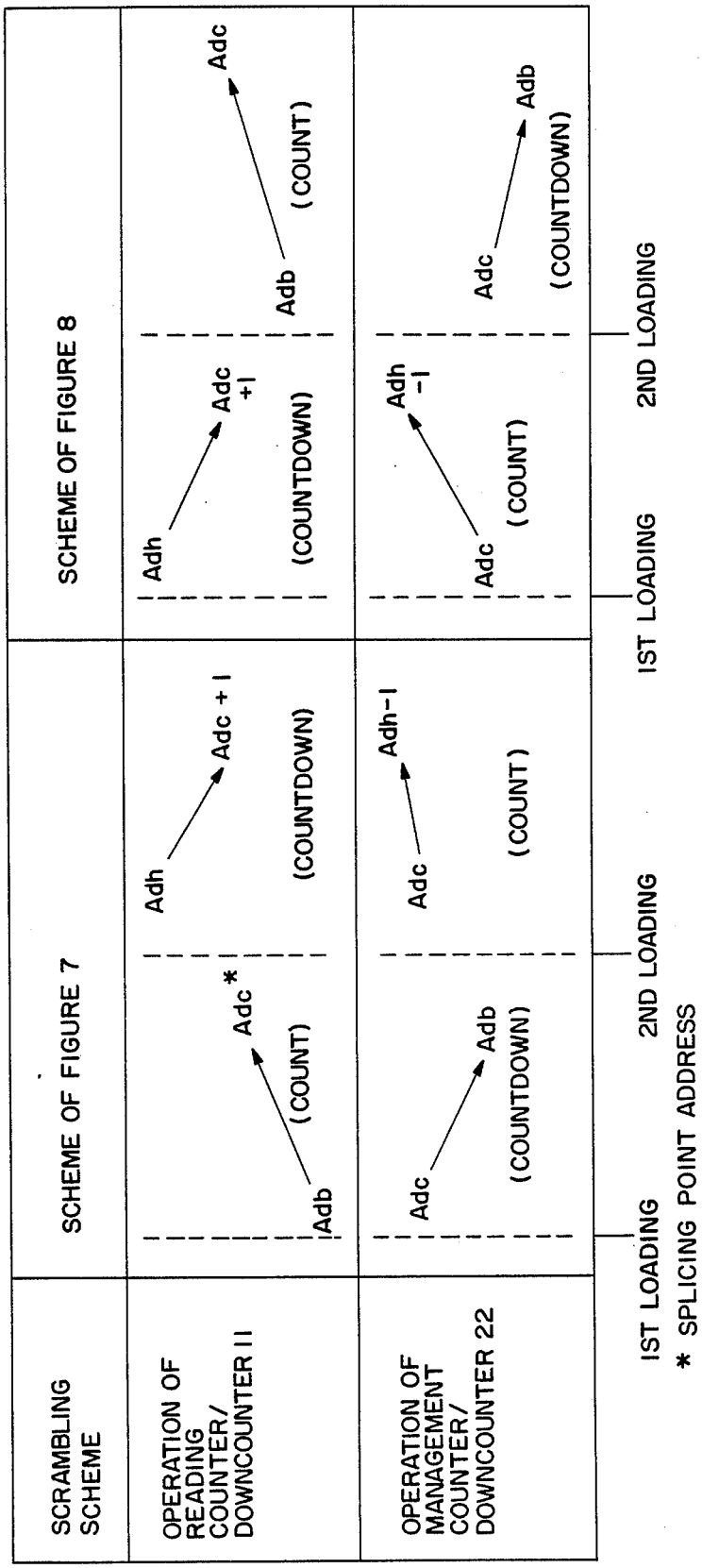

FIG. 3 is a schematic diagram of the useful part of a line or component (luminance or colour difference) of a video signal before scrambling, FIG. 4 is the diagram of the line of FIG. 3 scrambled through circular offsetting of segments, FIG. 5 is the diagram of the line or component of FIG. 3 scrambled by reversing the first segment, over on itself, FIG. 6 is the diagram of the line or component of FIG. 3, scrambled by locally reversing the two segments, FIG. 7 is the diagram of the line or the component of FIG. 3 scrambled by reversing the second segment, FIG. 8 is the diagram of the line or the component of FIG. 3 scrambled by reversing the second segment, then permutating it with the first segment, FIG. 9 is a block diagram of a scrambling apparatus generating the diagrams of FIGS. 7 and 8, and FIG. 10 is a diagram illustrating the operation of the apparatus of FIG. 9.

In FIG. 3, the useful portion of a television line (composite signal or MAC signal) or of a component (luminance or colour difference) is shown symbolically starting at a point A and ending at a point C.

For the purpose of presentation, the signal is represented by a stretched hexagon, with two points converging to the points A and C respectively. Line B represents a cut whose position in the line or component is defined in a pseudo-random manner.

Thus, line B defines a first segment AB and a second segment BC.

In FIG. 4, the scrambled line or component is shown being transmitted by using a permutation of the segments. Segment BC is seen to be ahead of segment AB. Immediately behind point B, the slashed area represents the tail of the first transition. Immediately after point A, there is an analogous tail, marked by slashes. Upon descrambling, the slashed area which follows point A is between point A and line D of FIG. 3, that is in an invisible area to the viewer, given the oversweeping of televisions. However, the area following the first B point of FIG. 4 is behind line B of FIG. 3 and is therefore visible. To cover this defect, the segment AB of FIG. 4 must have a small portion of the signal following line B of FIG. 3 (principle of overlapping).

In FIG. 5, the scrambled line or component is shown being transmitted by using local reversing the first segment which became BA. Behind the first B point, the same defect exists as at the line of FIG. 4. Behind the second B point, an analogous defect is shown represented by a slashed area. It is obvious that upon descrambling, it is necessary to foresee a substantial overlap to cover the defect.

In FIG. 6, the scrambled line or component is shown transmitted by locally reversing the first and second segments. The same defect exists behind the first B point, which can be masked by an overlap of the same order as that used in the case of FIG. 4. On the other hand, the slashed area behind point C is, upon descrambling, behind line E of FIG. 3, that is again in an area invisible to the viewer.

It is apparent that using the scrambling of FIGS. 4 to 6 leads to an overlap beyond point B, that is a reduction of the useful information, which is particularly sensitive in the case of FIG. 5.

In FIG. 7, we have shown the scrambled line or component transmitted when the second segment was locally reversed and became CB. There is a distorted area behind point C, which upon descrambling falls behind line E of FIG. 3, and is thus invisible. There is a distorted area behind point A, which after descrambling, is between A and line D and which is thus also invisible. It is apparent that the scrambling scheme of FIG. 7 does not require overlapping and is therefore of particular interest.

In FIG. 8, the scrambled line or component is shown being transmitted by using the reversing the second segment which becomes CB, followed by the circular offsetting of the reversed segment CB with respect to the non-reversed first segment AB. The distorted areas behind point C and point A respectively fall, upon descrambling, in the invisible portions of the television. Thus, this scrambling scheme does not require any overlapping either.

The two scrambling schemes shown in FIGS. 7 and 8 preserve the integrity of the information around a cut. The useful length is thus not reduced anymore than in conventional television where oversweeping always supresses the lateral sides of the picture.

FIG. 9 gives a realization example of a scrambling apparatus. This type of apparatus can scramble a composite signal, in which case it treats useful lines as undividable entities, with a splicing point defined at each line. The apparatus can also be used to scramble a MAC component signal, in which case:

either the MAC video line can be considered as an undividable entity and a single splicing point is defined at each line, or each component is scrambled separately and it is necessary to provide one apparatus per component present in the useful line, that is two apparatus, for two splicing points defined at each line: one in the colour difference signal and one in the luminance signal.

It is assumed that the video signal has been sampled and digitized before being introduced into the apparatus and that it is accompanied by the clock He that was used for its sampling, as well as video synchronization information SI. The information SI can be extracted, in a known manner, from a composite signal (PAL, SECAM, NTSC) or from a MAC signal.

The time base circuit 5 generates, by counting from He and SI, a line parity information signal P1, a command signal on link 15 to initiate writing into memory and loading of an address counter 10 at each useful line, a control signal on link 29 to initiate reading from memory and loading of the management counter/downcounter 22 at each useful line, and reading clock signal H2, derived from He. The clock signal H2 is necessary during scrambling of a component of a video signal for simultaneously carrying out time compression (in the case of a MAC signal). If the video signal to be scrambled is coded in composite form, it is not absolutely necessary to generate H2 since the reading clock is then identical to the writing clock He.

The digitized video signal to be scrambled is applied to the scrambling apparatus through link 1 which has as many wires as sampling bits and which is connected, in parallel to the data inputs of two memories 2 and 3. The outputs of memories 2 and 3 are connected to the output link 4 of the apparatus.

The output of the writing address counter 10 is connected, in parallel, to the input of a logic circuit 16 and to the inputs of two multiplexers 12 and 13. The output of circuit 16 is connected to the first two inputs of two AND gates 7 and 8. The second inputs of gates 7 and 8 receive the information P1 directly and through an inverter 9 respectively. The third inputs of AND gates 7 and 8 receive the writing clock signal He. The outputs of gates 7 and 8 are connected to the write enable inputs of memories 2 and 3 respectively.

The read enable inputs of memories 2 and 3 are connected to the outputs of two AND gates 33 and 35 respectively. The first inputs of gates 33 and 35 receive the information signal P1 through an inverter 6 and directly, respectively. Their second inputs are connected, via a link 34, to an output of a circuit 37. In practice, the output signals of gates 33 and 35 control the output states, either "high impedance" or "data available", of memories 2 and 3.

Thus, for lines of one parity, the memory 2 holds the information which is delivered to it through link 1 while its output assumes the "high impedance" state, while memory 3 generates on link 4 the data which is registered at the previous line. For lines of the opposite parity, the states are inverted.

The apparatus of FIG. 9 also has a reading address counter/downcounter 11 whose output is connected in parallel to the second inputs of multiplexers 12 and 13. The control inputs of multiplexers 12 and 13 receive the information P1 through an inverter 14 and directly, respectively.

Thus, for the lines of one parity, the multiplexer 12 transmits the writing addresses generated by counter 10 to the memory 2 while the multiplexer 13 transmits the reading addresses generated by counter/downcounter 11 to the memory 13. For the lines of the other parity, these states are inverted.

The writing address counter 10 has its clock input for receiving He and its loading input connected to output 15 of time base circuit 5. From the moment that it is loaded, the counter 10 counts from a loading value of Adb, or low address, to a loading value Adh, or high address. This period corresponds to the presence of useful data stored in the memories. Having reached the value Adh, the counter 10 stops until the next loading command. The logic circuit 16 generates a memory write enable signal during the periods where the counter 10 is enabled, allowing the gates 7 or 8 to enable the input write enables of memories 2 or 3 during the same periods.

The apparatus of FIG. 9 also has a dual purpose circuit 23. On one hand, it generates the addresses of the splicing points and the type of scrambling scheme. These two types of information are generated by a pseudo-random generator which is included in circuit 23. On the other hand, it generates the initialization word of the pseudo-random generator and of the data which are transferred to the receiver by an output link 24, these data being necessary for the receiver to recover the descrambling key. This data can be transferred to the descrambler by various means: via DIDON or CEEFAX channel if the scrambled signal is composite coded, or via a particular packet of the digital multiplex D2 or C-MAC/packets if the signal is coded in MAC.

The circuit 23 generates through 25 a signal indicative of the type of scrambling, either the scheme of FIG. 7, or that of FIG. 8; and through 26 it generates the address of the splicing point.

The address of the splicing point is loaded, through link 26, into a management counter/downcounter 22, which has its clock input connected to the H2 output of time base circuit 5. Its control input determines its state as a counter or downcounter and is connected to output 19 of logic circuit 37, through inverter 31. Its loading control input is connected to output 27 of an OR gate 28 whose first input is connected to output 29 of time base circuit 5 and whose second input is connected to an output 30 of logic circuit 37. The output 32 of counter/downcounter 22 is connected to an input of logic circuit 37.

From the signals applied to its inputs 32, 29 and 25, the logic circuit 37 generates a control signal for loading of the reading counter/downcounter 11 through a link 18, a control signal for loading of the management counter/downcounter 22 through a link 30, an information signal characteristic of the selected scrambling scheme through link 19 and a memory read enable information signal through link 34.

The link 19 is connected to the control inputs of counter/downcounter 11 (set to the "counting" state or the "downcounting" state) and to a multiplexer 20. The output of multiplexer 20 is connected, by a link 21, to the loading input of counter/downcounter 11, the load value being selected between two possible values Adb or Adh. The reading counter/downcounter 11 has its clock input H2 connected to time base 5, and its loading control input is connected to output 18 of logic circuit 37.

The operation of circuits 22, 37, 11 and 20 will be better understood by referring to the table of FIG. 10. The reading counter/downcounter 11 supplies to memories 2 and 3 reading addresses which vary between Adb and Adh. To realize the scrambling schemes of FIGS. 7 and 8, the reading counter/downcounter 11 sweeps the set of addresses as shown in FIG. 10. It is loaded twice per line, once with address Adb, once with address Adh. The order in which these values are loaded depends on the scrambling scheme. The loading instant of the first value is at a fixed time; subsequently, the loading instant of the second value depends on the choice of the splicing point. The detection of a time varying state (address of the splicing point) is a relatively complex operation to carry out. The counter/downcounter 22 sweeps the sets of addresses as shown in FIG. 10. The determination of the second loading instant is achieved by detecting, either address Adb, or address Adh-1, depending on the scrambling scheme selected.

Logic circuit 37 carries out this address detection operation and deduces the loading controls of the counter/downcounters: from the state of management counter/downcounter 22 which it is supplied to it via link 32, and from information concerning the type of scrambling scheme which is supplied to it via link 25; it determines the second loading instant of counter/downcounters 11 and 22. A second loading command is sent to management counter/downcounter 22 by link 30, the first loading command being delivered through link 29 and coming from time base circuit 5. From the first loading command which it receives by link 29 and the determination of the second loading instant, the logic circuit 37 generates a loading command for reading counter/downcounter 11 through link 18. On the other hand, given the scrambling scheme selected and in accordance with FIG. 10, the logic circuit 37 determines, at each instant, what must be the state, "counting" or "downcounting", of each of the circuits 11 and 22. This information is present on link 19. Finally, the logic circuit 37 determines memory read enable windows from the state of management counter/downcounter 22. This information is delivered through link 34.

The addresses loaded in the reading counter/downcounter 11 (Adb or Adh) are sent by multiplexer 20 controlled by logic circuit 37 through link 19 which serves in other respects to determine the setting to either the counting or downcounting state of 11. This is explained by the fact that a low address loading Adb is accompanied by the logic setting of 11 to the counting state and that the loading at the high address Adh is accompanied by setting 11 to the downcounting state.

We will now describe the operation of the apparatus of FIG. 9. We will assume that, during the even lines, the video samples will be written into memory 2. The output of memory 2 is thus in the "high impedance" state and multiplexer 12 delivers to memory 2 the writing addresses coming from counter 10. The video samples are stored in the same order as they arrive. The writing process starts at the instant of the loading command of writing counter 10 and ends when it is blocked.

During the same time, the memory 3 has at its output the samples which were stored during the previous line. The multiplexer 13 delivers to memory 3 the reading addresses coming from counter/downcounter 11. These reading addresses evolve in accordance with FIG. 10 such that the physical scrambling operation is realized upon the reading of the data. The reading operation starts at the instant of the first loading command of counter/downcounters 11 and 22 supplied by circuit 5 through link 29. The memory previously in the "high impedance" state is set to the "data available" state. The process stops once the set of address values has been swept. At that moment, the memory 3 is reset to the "high impedance" state.

It is obvious that one could conceive of an apparatus similar to that of FIG. 9, but in which the physical scrambling process is carried out at writing. The roles of the memories would be inverted during the odd lines.

Upon reception, the descrambling apparatus would be analogous to the apparatus described in FIG. 9 and based on the same principles.

We claim:

1. A scrambling and descrambling process for a MAC signal wherein the useful signal is a sampled video signal, in which at least a part of the said useful signal is spliced into two adjacent segments (AB, BC) each of them having at least two states, the splicing point (B) between the two segments being defined in a pseudo-random manner which is synchronous at transmission and reception, characterized in that at transmission at each line and in a pseudo-random manner, a scrambling scheme is selected from two possible schemes, that is a local reversing of a second of said two segments or a reversing of the second segment followed by permutations with a first of the two segments, and in that upon reception, the inverse processing of the process which occurred at transmission is applied in order to reintroduce intelligibility to the video signal, that is a local reversing of second received signal or a reversing of the first received signal followed by the permutation with the second received segment.

2. A process in accordance with claim 1, characterized in that the scrambling deals with the luminance component, on one hand, and on the colour difference component, on the other hand, the splicing points of the luminance component and the colour difference component being of similar structure.

3. A process in accordance with claim 1, characterized in that the scrambling deals with the luminance component, on one hand, and the colour difference component, on the other hand, the splicing points of the luminance component and the colour difference component not being of similar structure.

4. A process in accordance with claim 1, characterized in that the scrambling deals with the whole video line considered to be inseparable from its components.

5. A scrambling or descrambling apparatus for carrying out the process in accordance with one of claims 1 to 4, characterized in that it has memory reading control means with two counter/downcounters, the first of the two counters generating the reading addresses to memories, the second of the counters being used to determine when the leading and blocking of the first of the counters occurs.

* * * * *